INVENTOR.
PHILIP J. MAZZIOTTI

United States Patent Office 3,365,971
Patented Jan. 30, 1968

3,365,971
SYNCHRONIZING ARRANGEMENT FOR A
CHANGE SPEED TRANSMISSION
Philip J. Mazziotti, Toledo, Ohio, assignor to Dana Corporation, Toledo, Ohio, a corporation of Virginia
Filed Apr. 30, 1965, Ser. No. 452,206
28 Claims. (Cl. 74—339)

ABSTRACT OF THE DISCLOSURE

A change speed transmission having an input shaft, a countershaft drivingly connected to said input shaft and an output shaft adapted to be driven by pairs of cooperating speed reducing gears carried by the countershaft and the output shaft or to be directly driven by the input shaft. One of the gears of each of said pair of gears is constantly drivingly connected to one of the shafts for unitary rotation therewith while the other of said gears of each of said pair is mounted on its shaft for rotation relative thereto, with a clutch collar being carried for unitary rotation on the last mentioned shaft while being axially movable therealong so that it may clutchingly engage the rotatable gears to said shaft. Controlled engageable and disengageable coupling means are provided to selectively couple the input and output shafts so that when coupled on upshifting the kinetic energy of the input portion of the transmission may be imposed on the output portion by use of the coupling means thereby reducing the speed of rotation of the input shaft so that synchronization may occur between the input and output gears to enable them to meshingly engage. The coupling means may also be utilized to provide a direct drive connection between the input and output shafts.

Figure 1:
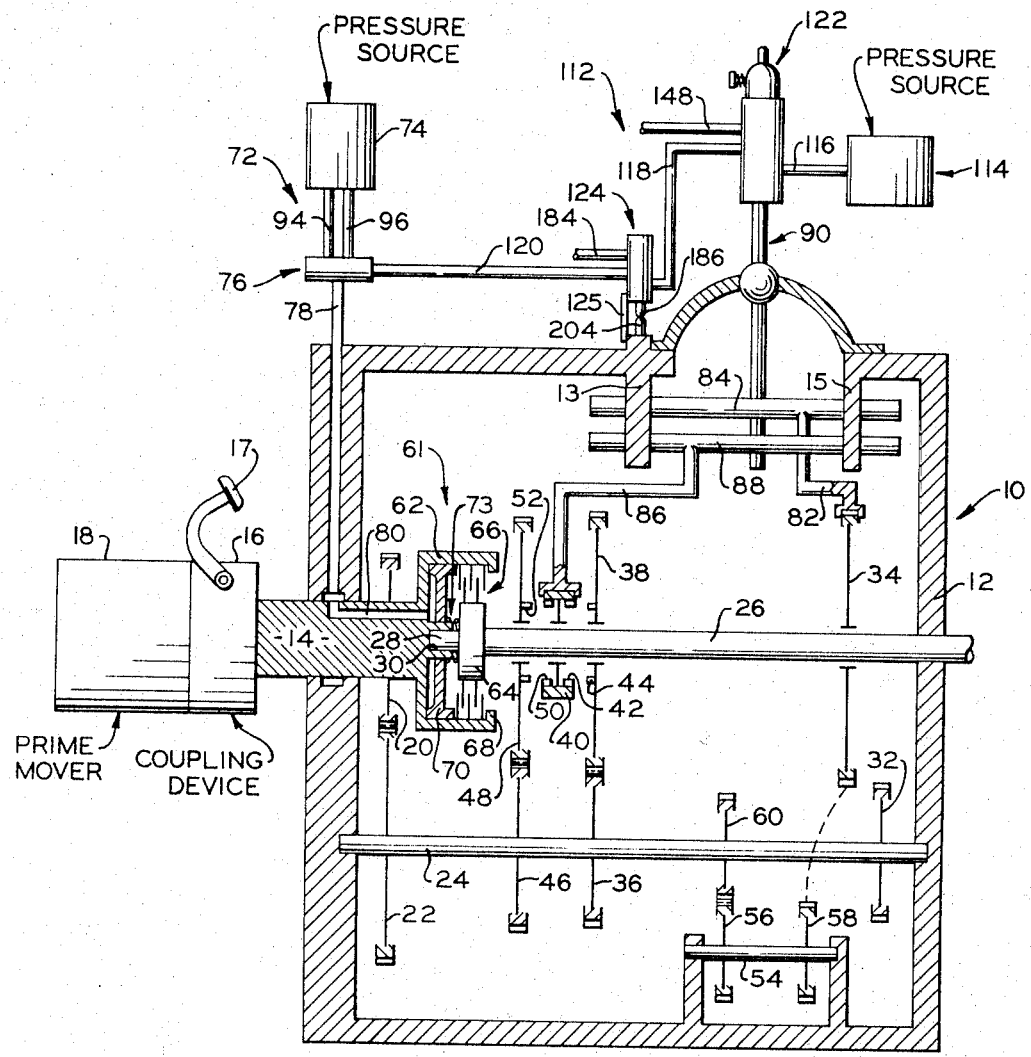

This invention relates generally to synchronizing arrangements and more particularly to a synchronizing arrangement including a clutch and the controls therefor for a change speed transmission which clutch is adapted to synchronizingly engage the input and output means of the transmission when it is desired to facilitate the shifting of the various gears of the transmission.

In the conventional transmission having change gear systems, the same normally includes an input shaft driven by a suitable source of rotative power such as a prime mover, a countershaft adapted to be driven by the input shaft and an output shaft adapted to be driven by the countershaft through various selected change speed gears connecting the latter two shafts; the output shaft is also conventionally adapted to be directly connected to the input shaft and directly driven thereby. A releasable or slipable coupling device is normally interposed between the prime mover and the transmission input shaft and conventionally take the form of a friction clutch, multiple disk friction clutch, fluid coupling or torque converter. The main purpose of the clutch is to provide for a slipable transfer of torque as power is transmitted to the transmission for example in starting a vehicle into motion and for interrupting the drive train during the shifting as is often the case when a fluid coupling is utilized.

In shifting the conventional change gear transmission requiring the disengagement and engagement of various toothed elements in the shifting operation in order to achieve a change in the gear ratio connection between the input and output shafts, subsequent to the disengagement of one set of toothed elements such requires the synchronization of the selected toothed elements prior to their engagement. In the interval between this disengagement and engagement, a portion of the transmission is being driven by the input shaft, while another portion is being driven by the output shaft. In downshifting the transmission from a lower to a higher ratio drive between the input and output shafts, that is in shifting at a time when the selected output driven toothed element is rotating at a greater speed than the selected input driven element, it is a convenient and conventional practice to utilize the prime mover for increasing the speed of the input shaft and the portion of the change gear system of the transmission connected thereto so that the speeds of the input driven toothed element desired to be engaged with the output driven toothed element are substantially the same. In upshifting, since the speed of the input driven toothed element will be greater than the output driven toothed element, some arrangement must be provided to decrease the speed of the input driven element and such is most desirably reduced rapidly so that the engagement of the toothed elements can be accomplished in a reasonable time.

The change speed gears of the conventional transmission are normally arranged in a paired relationship with one gear of each pair being carried by the countershaft and the other gear of each pair being carried by the output shaft. In one type of arrangement the pair of gears are of the constant mesh variety with one gear of the pair drivingly connected to the shaft carrying the same while the other gear of the pair is rotatably mounted on and adapted to be clutchingly engaged to the shaft carrying the same; such clutching engagement usually being accomplished by a toothed clutch element drivingly carried by the shaft and being shifted into engagement with cooperating toothed portions of the gear rotatably carried thereon. In another type of arrangement, both of the pair of gears are drivingly connected to the shaft carrying the same and are spaced from each other when disengaged with at least one of the gears adapted to be moved so as to bring the teeth of the pair of gears into a driving meshing engagement. Yet another of the other known types of arrangements utilizes a pair of gears each drivingly connected to the shaft carrying the same and spaced from each other with a third gear movable into mesh with both gears of the pair of gears to drivingly engage the same.

While it is known that in upshifting the speed of the input driven portion can be reduced to that of the output driven portion by placing the transmission assembly in neutral and disconnecting the input driven portion from the prime mover; thus, after a period of time, the undriven input portion will slowly decrease its speed to that of the output driven portion. Such an arrangement leaves much to be desired in that the period in which a shift is completed is extremely long. Accordingly, where a short shift period is desired some type of shifting arrangement has been utilized.

In many prior art transmissions a separate synchronizing arrangement is provided for each set of engageable elements to rapidly synchronize the speeds thereof. Such an arrangement, while being widely utilized, is undesirable from the standpoint that many synchronizing arrangements are required for each transmission and if such are of a capacity to provide satisfactory synchronization, the same occupy a substantial amount of space and are relatively expensive.

Another common method for rapidly synchronizing the speeds of the engaging toothed elements on upshifting from a higher ratio to a lower ratio drive between the input and output shafts is to apply a brake device to the input shaft or the portion of the change speed gear system being driven thereby for reducing the speed of the input driven toothed element to be engaged to that of the output driven toothed element to be engaged and completing the engagement of the toothed elements when the speeds thereof are substantially synchronized. Such brakes have a stationary reaction member and the braking action thereof has been applied to the input shaft driven portions of the transmission at many locations, such as the driven side of the clutch, the input shaft of the transmission, the countershaft of the transmission or to various shafts or gears drivingly connected to the countershaft or input shaft.

Such brakes, as referred to above, while being well known and enjoying substantial use in prior art devices, evidence many undesirable characteristics in their operation, such as: since the reaction of the brake is imposed on a stationary element, substantially all the kinetic energy of the input driven portion of the transmission arrested by the brake is converted to heat resulting in lost energy and the problem of dissipating such undesirable heat; since the reaction member of the brake is stationary, the speed of the input driven portion of the transmission is often reduced to a substantially lower level than necessary for synchronization with the resultant unnecessary loss in kinetic energy; the brake serves no useful function other than that of reducing the speed of the input driven portions of the transmission and wastefully occupies space.

It is an object of this invention to provide means for synchronizing the speeds of the desired engaging portions of the input and output driven portions of a change speed transmission system on the upshifting thereof which does not have the above mentioned undesirable features.

It is another object of this invention to provide means for synchronizing the desired engaging portions of the input and output driven portions of a change speed transmission system wherein such means transmits at least a portion of the kinetic energy absorbed from the input driven portions in reducing the speeds thereof to the output driven portions of the transmission.

It is yet another object of this invention to provide means for synchronizing the input and output driven portions of a change speed transmission system during the upshifting operations thereof which means may be utilized for purposes other than such synchronization.

It is a further object of this invention to provide means for synchronizing the speeds of the input and output driven portions of a change speed transmission system during the shifting operations thereof, which means may be utilized to drivingly connect the input and output driven portions in one of the desired gear ratios of the transmission.

Yet another object of this invention is to provide a means such as that described immediately above wherein the same drivingly connects the input and output shafts of the transmission in a direct drive relationship during the synchronization of said input and output driven portions and also connects the input and output shafts in direct drive.

It is yet a further object of this invention to provide a single means for synchronizing the speeds of the input and output driven portions of a multiple speed power transmission mechanism having rotary gear components, which means may be utilized when upshifting into any of the gear ratios of the transmission.

Figure 2:
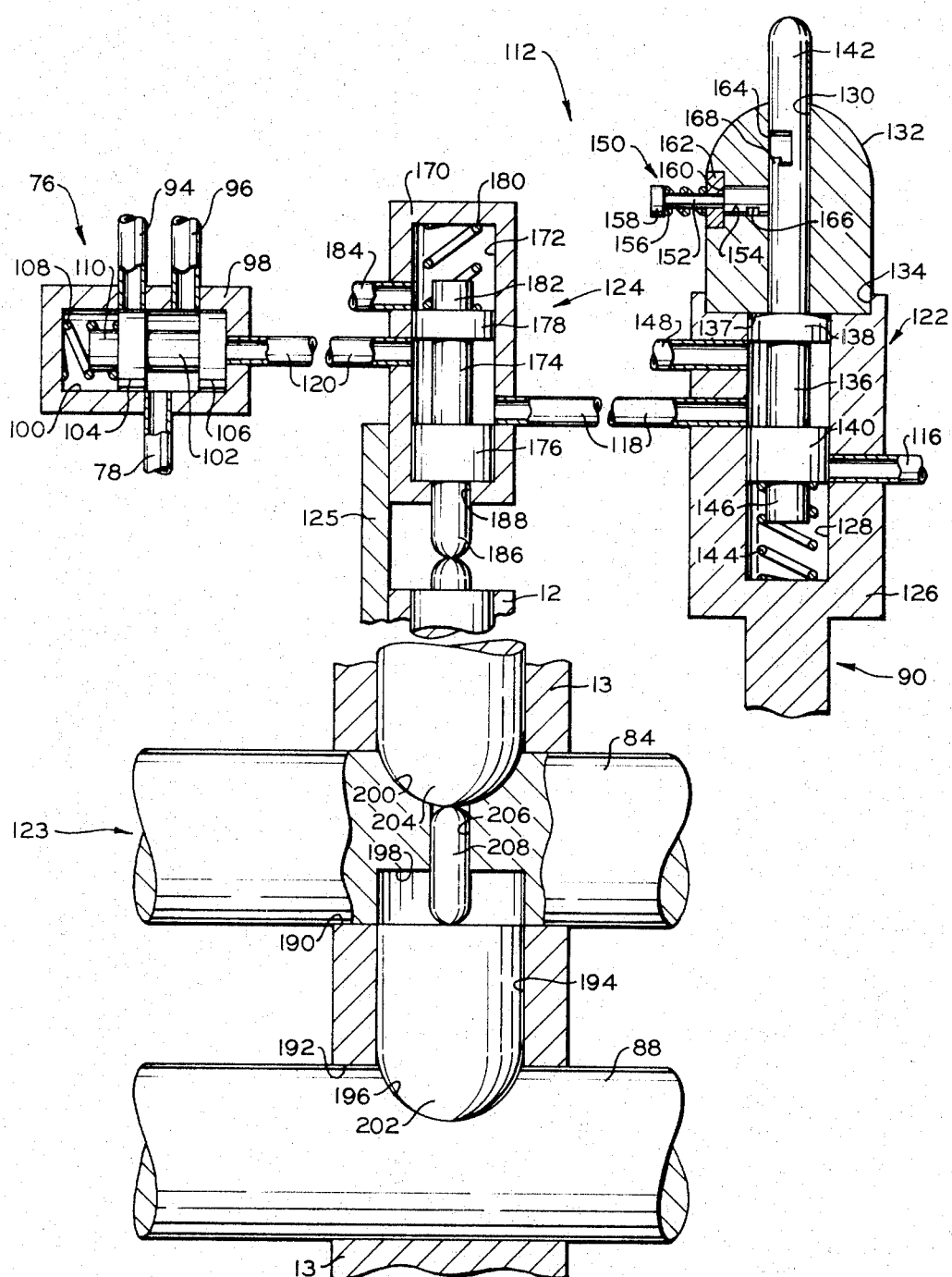

Further and other objects of this invention will become apparent upon a consideration of the specification when taken in view of the drawings wherein:

FIG. 1 is a diagrammatic view of an embodiment of this invention with portions thereof shown in section; and FIG. 2 is a diagrammatic representation of the control system of the embodiment of FIG. 1 with various portions thereof shown in section.

In a preferred embodiment of this invention, a change speed transmission having an input shaft, a countershaft drivingly connected to said input shaft and an output shaft adapted to be driven by the selected one of a plurality of pairs of cooperating and speed reducing gears carried by the countershaft and the output shaft or to be driven directly by the input shaft, is drivingly connected to a prime mover through a coupling device. One gear of each cooperating pair of gears is carried by the countershaft while the other gear of each pair of gears is carried by the output shaft, with one of said gears being secured to the shaft carrying the same for unitary rotation while the other gear is rotatably mounted on the shaft carrying the same. The latter shaft drivingly carries a shiftable element having a toothed portion adapted to be drivingly engaged with a cooperating toothed portion of the rotatable gear to drivingly connect the rotatable gear to the shaft carrying the same whereby the input shaft and output shaft are drivingly connected. It is noted with this arrangement that, when the toothed portions are disengaged, both gears of the pair of gears are driven by the shaft to which the one gear is secured and form a part of the particular portion, input or output, of which said shaft is a member.

Additionally, one of the gears of a pair of gears is constantly drivingly connected to one of the shafts for unitary rotation therewith while the other gear of said pair of gears is mounted on the shaft carrying the same for unitary rotation while being axially movable therealong and, has a disengaged position wherein it is axially spaced from said one gear and an engaged position which is attained by moving axially relative to the shaft carrying the same so that peripheral teeth thereon engage peripheral teeth on said one gear. It should be noted that said one gear of this latter pair of gears is drivingly connected to and forms a part of the portion of the transmission, input or output, to which said one shaft belongs while said other gear being drivingly connected to said other shaft forms a part of the portion of said transmission, input or output, to which said other shaft belongs.

Controlled engageable and disengageable coupling means are provided to selectively couple the input and output shafts so that when coupled on upshifting, the kinetic energy of the input portion may be imposed on the output portion by means of the coupling means thereby reducing the speed of rotation of the input shaft and the various portions connected thereto so that the engaging portions of the input driven portion of the transmission system and the engaging portion of the output driven portion of the transmission system may be engaged when the speeds are substantially synchronized. It is also contemplated that the coupling means may be utilized to provide direct drive connection between the input and output shafts for direct drive.

Referring to the drawings, a transmission system is shown generally and diagrammatically at 10 and includes a housing or case 12; which housing mounts the various components of the transmission system. An input shaft 14 is rotatably mounted in the housing 12 and has portions extending internally and externally of the same. The left or external portion of the input shaft is conventionally drivingly connected to a coupling device 16, which device, in turn, is conventionally drivingly connected to a prime mover 18.

As shown, the coupling device 16 is of the friction clutch type and manually operable by a foot pedal 17; however, the same may alternately take any one of a number of suitably actuated conventional forms such as a torque converter, fluid coupling, or multiple disk clutch as dictated by the desired performance of the transmission system in the mechanism in which the same is utilized.

On the portion of the input shaft immediately within the housing 12 is fixedly mounted an input drive gear 20 for unitary rotation therewith, which gear 20 is constantly drivingly meshed with a countershaft drivegear 22; the latter gear being fixedly secured to the left end of a countershaft 24 rotatably mounted in the housing 12 and disposed in a spaced parallel counter-rotating relationship with the input shaft 14.

An output shaft 26 is disposed coaxially with the input shaft 14 and parallel with and overlapping the countershaft 24 and has the left end 28 thereof pilotingly received in a bore 30 formed in the right end of the input shaft 14, while the right end of the shaft 26 is rotatably mounted in the housing 12 and conventionally extends therefrom so that suitable means (not shown) may be connected thereto to receive the output torque from the transmission system 10. A first pair of high ratio (low speed) peripherally toothed gears are carried by the countershaft and output shaft and adapted to drivingly connect the same for counter-rotation so that the input shaft drives the output shaft at a reduced speed. More particularly, a first countershaft gear 32 is fixedly secured for unitary rotation to the right end of the countershaft 24 and a first output shaft gear 34 is mounted on the output shaft 26 adjacent the right end thereof, the gear 34 being preferably splined on the shaft 26 for unitary rotation therewith while being axially movable therealong. The gears 32 and 34 are a pair of cooperating gears; the gear 34 being normally disposed to the left of the gear 32 in an axially spaced relationship and is adapted to be moved to the right along the shaft 26 so that the peripheral teeth thereof will be brought into engagement with the peripheral teeth on the gear 32, thereby drivingly connected the input and output shafts 14 and 26 by means of the gears 20 and 22, the countershaft 24 and the pair of cooperating first gears 32 and 34. When the gears 32 and 34 are free from engagement, the gear 32, being drivingly connected to the countershaft 24, forms a part of the input portion of the transmission assembly 10, while the gear 34, which is splined to the output shaft 26, forms a part of the output portion of the transmission assembly 10.

A second pair of intermediate ratio (second speed) peripherally toothed gears are carried by the countershaft and output shaft and adapted to drivingly connect the same for counter-rotation so that the input shaft drives the output shaft at a reduced speed. More particularly, a second countershaft gear 36 is fixedly secured for unitary rotation and against axial movement to the countershaft 24 intermediate the ends thereof and a second output shaft gear 38 is constantly in mesh with the gear 36 and rotatably mounted on the output shaft 26 while being fixed against axial movement relative thereto. A shiftable element or collar 40 is splined on the shaft 26 for unitary rotation therewith and being axially movable therealong and disposed immediately to the left of the gear 38. The collar 40 has a toothed engaging portion 42 on the right side thereof adapted to engage a toothed engaging portion 44 on the left side of the gear 38. The collar 40 is normally spaced to the left from the gear 38 with the toothed portion 42 thereof free from engagement with the toothed portion 44 of the gear 38, and is adapted to be moved axially to the right along the shaft 26 whereby the toothed portion 42 engages the toothed portion 44 and drivingly connects the gear 38 to the shaft 26. When the collar 40 is positioned so that the toothed portions 42 and 44 are free from engagement, the cooperating second gears 36 and 38 are driven by and form a part of the input portion of the transmission system 10, while the collar 40, splined to the shaft 26, is a part of the output portion of the transmission system 10.

A third pair of low ratio (third speed) peripherally toothed gears are carried by the countershaft and output shaft 24 and 26 and adapted to drivingly connect the same for counter-rotation and so that the input shaft drives the output shaft at a reduced speed. A third countershaft gear 46 is fixedly secured on the shaft 24 intermediate the gears 22 and 36 and adapted for unitary rotation therewith. A cooperating third output shaft gear 48 is rotatably mounted on the output shaft 26 and fixed against axial movement relative thereto while being constantly in mesh with the third countershaft gear 46 and constantly driven thereby so that the third gears 46 and 48 form a part of the input portion of the transmission assembly 10. The collar 40 has a second toothed engaging portion 50 on the left side thereof which is adapted, when the collar is moved to the left along the shaft 26, to engage a cooperating toothed engaging portion 52 on the right side of the third output shaft gear 48 thereby drivingly connecting the gear 48 to the output shaft 26. It should be noted that the collar 40 has a central or neutral position wherein the toothed portions 42 and 50 thereof are free from engagement with the toothed portions 44 and 52 of the gears 38 and 48 respectively.

Means are provided for attaining reversed rotation of the output shaft 26 relative to the input shaft 14 and rotation thereof in the same direction as the countershaft 24. More particularly, a reverse idler shaft 54 is rotatably mounted in the housing 12 and has fixedly secured thereon a pair of spaced gears 56 and 58 for unitary rotation therewith and with each other. The leftward gear 56 is in constant mesh with a countershaft reverse gear 60 securely mounted on the countershaft 24 for unitary rotation therewith and positioned intermediate the first and second countershaft gears 32 and 36 so that the idler shaft 54 is constantly driven by the countershaft 24. In FIG. 1, the shaft 54 is shown displaced from its normal position for illustration purposes, the same being conventionally positioned whereby the peripheral teeth of the rightward gear 58 thereon are adapted to be engaged by the peripheral teeth on the first output shaft gear 34 when the latter is moved axially to the left along the output shaft 26 from its disengaged or neutral position shown in FIG. 1, whereby the output shaft is driven in reverse rotation from the input shaft 14 by the gears 20 and 22, the countershaft 24, the gears 60 and 56, the idler shaft 56 and the gears 58 and 34.

Controllable coupling means, shown generally at 61 in the form of a conventional multiple disk clutch, is provided to directly and drivingly connect the input and output shafts 14 and 26. More particularly the right end of the input shaft 14 has formed thereon a cylinder portion 62 which surrounds an enlarged hub 64 formed on the output shaft 26 adjacent the end 28 thereof. A plurality of interleaved friction disks shown generally at 66 are disposed within the cylinder 62 and surrounding the hub 64 with some of said disks being secured to the cylinder for unitary rotation and others being secured to the hub for unitary rotation. The right end of the cylinder 62 is provided with a radially inwardly extending flange 68 against which a piston type pressure plate 70 is adapted to press the friction disks 66 thereby frictionally coupling the input and output shafts 14 and 26 to each other. The pressure plate 70 is of annular form and is slidably disposed on the right end of the input shaft 14 within the cylinder 62 and is normally positioned to the left, as shown in FIG. 1, where it is free from engagement with the friction disks 66 and is adapted to be moved to the right into engagement with the friction disks. Resilient means shown generally at 73 are adapted to maintain the pressure plate 70 in its leftward position, while pressure fluid supply means shown generally at 72 is adapted to supply pressurized fluid to the cylinder to urge the pressure plate to the right.

More particularly, the pressure fluid supply means 72 includes a pressure source of pressurized fluid 74 and a control valve 76 therefor, which means 72 is joined by a conduit 78, a portion of which is disposed in the housing 12, with a passage 80 formed in the input shaft 14. The passage 80 extends from the surface of the shaft 14 at a position wherein it is confluent with the conduit 78 and extends axially to the right to open within the cylinder 62 to the left of the pressure plate 70 so that pressure fluid from the supply means 72 through the conduit 78 and passage 80 is operative to urge the pressure plate 70 to the right and frictionally engage the friction disk 66.

Means are provided to shift the gear 34 and the collar 40 axially along the output shaft 26. More particularly a shift yoke 82 is connected to a shift rod 84, the latter being slidably disposed in spaced bosses 13 and 15 carried by the housing 12, and is adapted to shift the gear 34 axially to the right and left from the central position shown in FIG. 1, while a shift fork 86 secured to a shift rod 88, the latter being slidably disposed in the bosses 13 and 15, and is adapted to shift the collar 40 to the left or right from its central or neutral position shown in FIG. 1. A conventional shift lever, shown generally at 90, is mounted in the housing 12 and is operable to shift the rods 84 and 88 in a well known manner.

The pressure source of pressurized fluid 74 is connected to the control valve 76 by a pair of conduits 94 and 96; the conduit 94, on the left, supplying pressurized fluid to the valve 76 while the conduit 96, on the right, providing a vent for fluid from the valve 76 to return the same to the pressure source 74. The valve 76 includes a housing 98 having an elongated bore 100 therein, which bore receives a spool type valve stem 102 having a pair of spaced lands 104 and 106 slidably engaging the bore 100. A spring 108 is disposed between the left land 104 and the closed left end of the bore 100 and normally biases the stem 102 to the right into abutting engagement with the right end of the bore; when the stem is positioned to the right, the valve 76 is considered as being in its first position. In the first position of the stem 102, the land 104 blocks the conduit 94 while the conduits 96 and 78 are in a confluent relationship and fluid in the cylinder 62 is vented through the passage 80, conduit 78 and conduit 96 to the pressure source 74. When the stem 102 is moved to the left against the biasing force of the spring 108 until a pilot 110 formed on the left end thereof engages the left end of the bore 100, the valve 76 is considered as being in its second position and the land 106 blocks the conduit 96 while the conduits 94 and 78 are joined in a confluent relationship thereby providing pressurized fluid to the coupling means 61 through the conduit 78 and the passage 80, which fluid acts upon the pressure plate 70 and biases the same to the right against the resilient means 73 to frictionally engage the friction disk 66.

A control system shown generally at 112 is provided to control the position of the valve stem 102 and thereby positioning the valve 76 in its first or second position to control the flow of pressure fluid from the pressure fluid supply means 72 to the coupling means 61 and control the engagement and disengagement of the latter. More particularly a second pressure source of pressure fluid shown generally at 114 is connected by conduits 116, 118 and 120 to the right end of the valve 76; the conduit 120 being confluent with the bore 100 at the closed right end thereof and operative to admit pressure fluid thereinto to bias the stem 102 to the left or, alternately, to vent pressure fluid from the bore 100 so that the spring 108 is operative to bias the stem 102 to the right.

A first control valve 122 is interposed between the conduits 116 and 118 and a second control valve 124 is disposed between the conduits 118 and 120 to control the flow of pressure fluid from the pressure source 114 to the valve 76 and to vent the pressure fluid from the valve 76. The valve 122, as shown, is adapted to be manually operated and to that end is conventionally positioned in an integral relationship with the top of the shift lever 90; it being understood that other locations equally convenient to the operator may be selected, that valves other than a manually operated valve may be utilized and that the valve 122 may be associated with some other agency such as the coupling device 16.

The valve 122 includes a housing 126 formed as an enlarged integral portion of the lever 90 and having an elongated bore 128 formed therein, which bore is closed at its lower end. The upper end of the bore 128 is coaxial with a counterbore 130 formed in a shift knob 132, the counterbore 130 being smaller in diameter than the bore 128. The shift knob 132 is suitably secured in a counterbore 134 formed in the upper end of the housing 126, so that a shoulder 137 is formed at the junction of the bores 128 and 130. A spool type valve stem 136 is received in the bores 128 and 130 and has a pair of spaced lands 138 and 140 slidably received in the bore 128 and an actuating portion 142 extending upwardly from the upper land 138 and slidably received in the bore 130 while projecting from the upper end of the knob 132. A spring 144 is disposed between the lower land 140 and the lower closed end of the bore 128 and normally urges the stem 136 to its first position or upwardly so that the upper end of land 138 engages the shoulder 137. The stem 136 is also adapted to be urged to its second position or downwardly against the biasing affect of the spring 144 by manually depressing the actuating portion 142 until a pilot portion 146, projecting from the lower end of land 140 engages the lower end of the bore 128.

The conduit 116 is confluent with the pressure source 114 and extends into the bore 128 at a position wherein, when the stem 136 is in its upper or first position, the land 140 blocks the conduit 116 from the portion of the bore 128 thereabove and, when the stem is in its second position, the conduit 116 is confluent with the portion of the bore intermediate the lands 138 and 140. The conduit 118 enters the bore 128 so that, when the stem 136 is in its first and second positions, the conduit 118 is confluent with the portion of the bore 128 intermediate the lands 140 and 138. A vent conduit 148 connects with the bore 128 and is positioned so that, when the stem 136 is in its first position, the conduit 148 is confluent with the conduit 118 and when the stem is in its second position the conduit 148 is blocked from the conduit 118 by the land 138. Accordingly, when the stem 136 is in its first position, the conduits 116 and 118 are blocked from each other by the land 140 and the conduit 118 is connected to vent through the conduit 148.

Upon depression of the actuating portion 142, the stem 136 is urged downwardly to its second position wherein the conduit 118 is blocked from the vent conduit 148 by the land 138 and the conduits 116 and 118 are joined in a confluent relationship since at this time they both lie between the lands 138 and 140.

At times it may be desirable to maintain the valve 122 with the stem 136 in its second position, for reasons hereinafter described, and to that end a latch means 150 is carried by the shift knob 132; which latch means includes a manually operable plunger 152 slidably received in an opening 154 formed transversely in the knob 132 and intersecting the bore 130. A coiled compression spring 156 is disposed between the knob 132 and the inner portion of an enlarged boss 158 formed on the left end of the plunger 152 thereby biasing the plunger outwardly to the left so that the same does not project into the bore 130, while a shoulder 160 formed on the plunger engages an annular plug 162 secured in the left end of the opening 154 to prevent the plunger from moving further to the left from the position shown in FIG. 2. With the actuating portion 142 depressed so that the stem 136 is in its second position, the plunger 152 may be forced inwardly so that the inner end thereof enters a depression 164 formed in the actuating portion 142 and a notch 166 formed on the lower part of the plunger 152 is engageable by a detent 168 formed on the lower portion of the depression 164. Accordingly, when the plunger 152 is disposed in the depression 164 and the spring 144 biasing the stem 136 and actuating portion 142 upwardly, the plunger 152 will remain in the depression 164 as a result of the engagement of the notch 166 and detent 168 and the spring 156 can not bias the plunger to the left. Although the stem 136 will move slightly upward from its second position when the notch 166 and detent 168 become engaged, the conduits 116 and 118 will remain in a confluent relationship. By merely depressing the actuating portion 142 slightly, the detent 168 will move below the notch 166 and the spring 156 will then bias the plunger 152 to the left and free from engagement with the actuating portion 142.

The second control valve 124 includes a housing 170 suitably secured to the boss 13 by a plate 125 and having a bore 172 therein which bore receives a spool shaped valve stem 174 having spaced lands 176 and 178 slidingly engaging the bore 172. A spring 180 is disposed between the upper end of land 178 and the closed upper end of the bore 172 and normally urges the stem 174 downwardly to its first position wherein the lower end of the land 176 engages the lower end of the bore 172. The conduits 118 and 120 connect with the bore 172 at a position wherein, with the stem 174 in its first position the conduits 118 and 120 lie between the lands 176 and 178 and are in a confluent relationship.

The stem 174 is adapted to be urged to its second position or upwardly against the biasing force of the spring 180 until a pilot portion 182, formed on the upper end of the land 178 engages the upper closed end of the bore, in this second position of the stem 174, the land 176 blocks the conduit 118 from the conduit 120 and a vent conduit 184, connecting with the bore 172, is joined in a confluent relationship with the conduit 120, both the conduits 120 and 184 being disposed between the lands 176 and 178 at this time. Means are provided to move the stem 174 between its first and second positions. More particularly, an actuating portion 186 is formed integrally with the stem 174 and projects downwardly from the stem 176 through an opening 188 formed in the lower end of the housing 170, which actuating portion is adapted to be pressed upwardly thereby moving the stem 174 from its first to its second position.

Means, shown generally at 123, is provided for positioning the valve 124 in its first and second positions, in response to the neutralization of the transmission system 10 and to the attainment of any one of the gear ratio drive connections between the input and output shafts 14 and 26 respectively. Conveniently, the means 123 includes the shift rods 84 and 88 and utilizes the movement thereof into and out of their neutral position. The shift rods 84 and 88 are respectively slidably received in openings 190 and 192 formed in the boss 13, and an opening 194 is formed in the boss transversely with respect to the openings 190 and 192 and aligned with the actuating portion 186. The rod 88 is formed with a camming notch 196 which registers with the opening 194 when the rod 88 is in its central position, while the rod 84 is formed with a pair of diametrically opposed notches 198 and 200, the notch 200 being a camming notch, which likewise register with the opening 194 when the rod 84 is in its central position. A locking and actuating detent or poppet 202 is slidably disposed in the opening 194 intermediate the rods 84 and 88 and is adapted to cooperate with the notches 196 and 198. The poppet 202 is of a length so that when disposed in either the notch 196 or the notch 198 it will extend up to but not project into the other of the notches. An actuating detent or poppet 204 is slidably disposed in the opening 194 with the lower end thereof adapted to engage the notch 200 when the rod 84 is in its central position and the upper end thereof constantly engaging the lower end of the actuating portion 186. Upon the rod 84 being moved out of its central position the camming notch 200 will urge the poppet 204 upwardly relative to the rod and thereby urge the actuating portion 186 upwardly to position the stem 174 in its second position and, since the poppet 204 has moved out of the notch 200 and the poppet 202 is in the notch 196, the rod 84 is free to be moved axially, while the rod 88 is restrained from moving since the poppet 202 cannot at this time be moved from the notch 196. Upon the rod 84 returning to its central position the spring 180, which is constantly biasing the stem 174 and poppet 204 downwardly, returns the latter into the notch 200.

An opening 206 is formed diametrically in the rod 84 joining the bottoms of the notches 198 and 200 and an elongated transfer pin 208 is disposed in an opening 206 and, when the rods 84 and 88 are in their central position, engages the poppets 202 and 204. Accordingly, when the rod 88 moves from its central position the camming notch 196 will urge the poppet 202 into the notch 198, and the poppet 202 forces the pin 208 upwardly; the latter in turn forcing the poppet 204 and stem 174 upwardly so that the stem moves to its second position. With the poppet 202 positioned in the notch 198, the rod 88 is free to be moved axially while the rod 84 is locked in its central position by the poppet 202. Upon return of the rod 88 to its central position the spring 180 biases the stem 174, the poppet 204, the pin 208 and the poppet 202 downwardly so that the latter returns to the notch 196. It is thus apparent that, when the rods 84 and 88 are in their central positions and the transmission system 10 is neutralized, the stem 174 will be biased to its first position by the spring 180 wherein the conduits 118 and 120 are confluent, and when either of the rods 84 or 88 moves from its central position so that a pair of gears is drivingly connecting the input and output shafts 14 and 26, the stem 174 will be forced to its second position wherein the conduits 118 and 120 are not confluent and the conduit 120 is confluent with the vent conduit 184.

While, as shown in the drawings, the pressure fluid supply means 72 is contemplated as utilizing hydraulic fluid from the control system 112 is contemplated as utilizing pressurized air as the fluids therein, it is contemplated that means other than hydraulic fluids can be utilized to actuate the coupling means 61 and coupling means other than pressure fluid actuated clutches may be utilized in place of the coupling means shown at 61: some of the requirements being that the particular coupling means selected should not be solely of the instantaneous or positive coupling type, such as a dog clutch, so that a progressive coupling of the input and output shafts 14 and 26 can be accomplished and the coupling means should be capable of operating sufficiently rapidly to obtain synchronization in the desired time. Illustrative examples of desirable coupling means are various types of friction clutches, electromagnetic clutches, and certain hydrostatic and hydrokinetic coupling devices. It is also contemplated that various control means can be utilized to actuate the coupling means 61 other than the one shown and described while obtaining the desired operation thereof.

While there are devices known in the art and commonly referred to as split-torque hydrokinetic transmissions wherein a portion of the input is directed through a hydrokinetic coupling device to the output shaft and another portion of the input is directed through change speed gearing to the output shaft so that the coupling device connects the input and output, such transmissions do not provide for or contemplate the use of the coupling device in the manner of this invention.

OPERATION

Commencing with the transmission system 10 in a neutral condition, the output shaft 26 stationary, and the prime mover at idle conditions, as would be the case if the transmission system is being utilized in a vehicle which at this time is stationary, to shift into the first or reverse gear ratios, the following procedure is contemplated: the coupling device 16 is disengaged by depressing the manually operated pedal 17 associated therewith thereby interrupting the drive from the prime mover to the input shaft 14 and the actuating portion 142 of the first control valve 122 is depressed. The valve 122 having been moved to its second position joins the conduits 116 and 118 in a confluent relationship and, since both the rods 84 and 88 are in their central position and the stem 174 in its first position joining the conduits 118 and 120 in a confluent relationship, pressure fluid from the pressure source 114 enters the bore 100 of the valve 76 and biases the stem 102 to the left to its second position joining the conduits 94 and 78 in a confluent relationship so that the pressure fluid supply means 72 supplies pressure fluid to the coupling means 61 and engages the same.

With the coupling means 61 engaged, the speed of the input shaft 14, the countershaft 34, and the gears 32, 60, 36 and 46 is reduced to that of the stationary output shaft 26 so that the first output shaft gear 34 may easily be shifted, by manipulating the lever 90, into engagement with either the first countershaft gear 32 or the reverse gear 58 thereby conditioning the transmission assembly 10 for operating in the first gear ratio or in the reverse gear ratio. Upon manipulation of the lever 90 and the accompanying movement of the rod 84 in leaving its central position to engage the desired ratio, the poppet 204 will move upwardly and position the valve 124 in its second position thereby terminating the confluent relationship between the conduits 118 and 120 and confluently joining the conduit 120 to the vent conduit 184 and venting the bore 100 of the valve 76. The stem 102 is then moved to the right by the spring 108 so that the conduits 78 and 94 are no longer in a confluent relationship and the conduit 78 becomes confluent with the vent conduit 96 and vents the coupling means 61 so that the same becomes disengaged and the input shaft 14 is connected to the output shaft 26 solely by the selected engaged gears. The operator, upon manipulating the lever 90 to shift to first or reverse, need not release the actuating portion 142 to return the valve 136 to its first position since the movement of the rod 84 from its central position automatically stops the flow of pressure fluid from the conduit 118 to conduit 120 and vents the latter, so that the position of valve 136 is immaterial at this time with respect to the controlling of the valve 76. After the first or reverse gear ratio is engaged, the operator re-engages the coupling device 16 and manipulates the control of the prime mover 18 in the conventional manner to accelerate the output shaft 26.

Assuming that the transmission assembly 10 has been shifted into the first gear ratio and the vehicle was being driven, to shift to the second gear ratio the following procedure is contemplated: the coupling device 16 is disengaged thereby interrupting the flow of power from the prime mover 18 to the input shaft 14, the operator depresses the actuating portion 142 of the valve 122 thereby placing the valve 122 in its second position and joins the conduits 116 and 118 in a confluent relationship, the valve 124 at this time remains in its second position since the rod 84 is displaced from its central position. The operator then moves the shift lever 90 to return the rod 84 to its central position to terminate the first gear ratio drive, whereupon the valve 124 is moved to its first position joining the conduits 118 and 120 in a confluent relationship and engaging the coupling means 61 as previously described it should be understood that the operator alternately can depress the actuating portion 142 simultaneously with moving the shift lever 90 to return the rod 84 to its central position or can even delay depressing the actuating portion until the rod 84 is in its central position.

Since at the time the coupling means 61 becomes engaged there is no geared connection between the input and output shafts 14 and 26, a substantial portion of the kinetic energy of the input shaft, and the portions of the transmisison assembly 10 driven thereby at this time, is imposed upon the output shaft in a useful manner (that is, the portion of the kinetic energy which is not converted to heat by the coupling means 61) and through this connection the speed of the input shaft is approachingly reduced to that of the output shaft. Further, since the second speed output shaft gear 38, which is about to be engaged to the output shaft 26, is being driven by the input portion at a reduced ratio, when the transmission assembly 10 is neutralized and the input shaft speed is completely reduced to the speed of the output shaft, the speed of the gear 38 will be less than the speed of the output shaft.

The teeth of all the engaging portions of the transmission assembly 10 are preferably of a well known clutching type, such as conical clutching teeth, which, when pressed into initial contact, will resist intermeshing engagement and the contacting surfaces will slide relative to each other until the speeds are substantially synchronized. Accordingly, on upshifting with the coupling means 61 energized, if the operator attempts to manipulate the lever 90 to move the rod 88 and the collar 40 connected thereto to the right to engage the engaging portion 42 thereof with the engaging portion 44 of the gear 38, the portions 42 and 44 will resist engagement until the speed of the gear 38 is reduced substantially to that of the output shaft 26, whereupon, the engaging portions will be engageable and the operator can complete the shifting manipulations. Upon the movement of the rod 88 from its central position, accompanied by the engagement of the portions 42 and 44, the valve 124 is returned to its second position thereby venting the bore 100 of the valve 76 and disengaging the coupling means 61 so that the input shaft 14 drives the output shaft 26 through the second gears 36 and 38. The operator then conventionally re-engages the coupling device 16 so that power once more flows from the prime mover to the input shaft 14.

If the operator misses his shift at the synchronized speed so that the speed of the gear 38 falls below the speed of the output shaft 26, he need merely engage the coupling device 16 and manipulate the speed of the prime mover 18 to increase the speed of the input shaft 14 and gear 38 until the speeds of the gear 38 and output shaft 26 again cross and complete the shift as would be the case on downshifting. Prior to such speeding up of the input shaft 14, the actuator portion 142 should be released to vent the conduits 116, 118 and 120 and disengage the coupling means 61, since the clutch is not utilized on downshifting.

To condition the transmission assembly 10 whereby the output shaft 26 is driven by the third pair of gears 46 and 48, the following steps are contemplated: the opeartor disengages the coupling device 16 thereby interrupting the flow of power from the prime mover 18 to the input shaft 14, depresses the actuating portion 142 which moves the valve 122 to its second position joining the conduits 116 and 118 in a confluent relationship and moves the lever 90 and the rod 88 to their central or neutral position which moves the valve 124 to its first position thereby joining the conduits 118 and 120 in a confluent relationship and supplying pressure fluid to the bore 100 of the valve 76 positioning the stem 102 in its second position and engaging the coupling means 61. As previously described, the actuating portion 142 can be depressed simultaneously with the movement of the lever 90 toward neutral or after neutral has been achieved. The operator then moves the lever 90 and rod 88 so that the collar 40 moves to the left and the engaging portion 50 thereon contacts the engaging portion 52 of the gear 48 and upon the speed of the gear 48 reaching that of the output shaft 26, the lever 90 can be further manipulated to move the engaging portions completely into engagement and drivingly connects the gear 48 to the output shaft 26; the movement of the rod 88 from its central position moving the valve 124 to its second position and venting the bore 100 of the valve 76 thereby disengaging the coupling means 61. The operator then conventionally re-engages the coupling device 16 so that power once more flows from the prime mover 18 to the input shaft 14 and from the input shaft to the output shaft 26 through the gears 20 and 22, the countershaft 34 and the gears 46 and 48.

To condition the transmission assembly 10 for direct drive operation, the operator depresses the pedal 17 thereby disengaging the clutch 16, presses on the actuating portion 142 thereby pressing the valve 122 in its second position and engages the latch means 150 with the actuating portion 142 to maintain the valve 122 in its second position. The lever 90 is then moved to a position to centralize the rod 88 and the collar 40 (the rod 84 at this time being centralized); the valve 124 assuming its first position when the rod 88 reaches its central position thereby connecting the pressure source 114 with the bore 100 of the valve 76 positioning the latter in its second position and causing engagement of the coupling means 61. The coupling device 16 is then re-engaged so that the output shaft 26 is driven from the prime mover directly by the input shaft 14 through the coupling means 61. As in the previously described shifting procedures, the depression of the actuating portion 142 and locking thereof can be done simultaneously with moving the lever 90 toward neutral or after the same has reached neutral.

As is well known, synchronizing means need not be utilized during downshifting since the output shaft and the portions driven thereby can be synchronized to the input shaft and the portions driven thereby by utilizing the prime mover in a well known manner.

It should be noted that the power from the prime mover to the input shaft 14 need not be interrupted on upshifting to accomplish synchronization, with the exception of shifting when the speed to which the input shaft need be reduced in order to achieve synchronization of the selected engaging portions is below the stall speed of the prime mover. For example, the prime mover need only have the torque output thereof momentarily reduced in a well known manner, as by a throttle dip arrangement, so that the particular engaging portions of the transmission assembly 10 which are at that moment engaged can be disengaged. When the transmission assembly 10 reaches neutral, the coupling means 61 can be engaged to couple the input and output shafts 14 and 26 thereby not only reducing the speed of the input shaft 14 and the portion of the transmission assembly 10 being driven thereby, but also the coupling means 61 will reduce the speed of the rotating portions of the coupling device 16 and the prime mover 18 during the synchronization period. In this manner substantially hot shifts, that is shifts in which the acceleration of the vehicle does not drop below zero, can be obtained since a substantial portion of the kinetic energy removed from the input driven portion of the transmission assembly 10 in synchronizing the same is transferred to the output driven portion. If the speed of the input shaft 14 must be reduced below the stall speed of the prime mover 18 to achieve synchronization, as for example when a vehicle is stationary and a shift is to be made into the first gear ratio, the coupling device 16 should be disengaged, if it is of the conventional friction clutch type, or be of the slippable torque transferring type like a fluid coupling or torque converter which will transfer less than stall torque at conditions of shifting, so that the coupling means 61 can be engaged and the speed of the input shaft 14 can be reduced to zero, that is, below the stall speed, to synchronize and allow the engagement of the desired gears without stalling the prime mover.

While this invention has been described with reference to the drawings it is understood that many contemplated modifications can be made therein without departing from the scope of this invention as defined by the following claims.

What is claimed is:

1. A change speed transmission comprising in combination, an input means, an output means adapted to be driven by said input means, a plurality of change speed driving means selectively connectable between said input and output means for providing a selected one of a plurality of reduced ratio driving connections therebetween, means for selectively engaging and disengaging said driving means in a driving relationship between said input and output means and including portions drivingly connected to said input means and portions drivingly connected to said output means, and a single synchronizing means operable on upshifting to any selected one of said change speed driving means for coupling said input and output means and reducing the speed of a portion of the engaging means connected to said input means to the speed of a portion of said engaging means connected to said output means so that said portions of said engaging means are synchronized and can be engaged to connect said selected driving means in a driving relationship between said input and output means said synchronizing means becoming operable for coupling said input and output means only when said driving means are in a non-driving relationship.

2. A change speed gear transmission comprising in combination shaft, an output shaft, a countershaft driveable by said input shaft, a plurality of pairs of change speed gears with said pairs being selectively engageable to drivingly connect said countershaft and output shaft whereby said input shaft is adapted to drive said output shaft in a variety of gear ratios, means for selectively engaging and disengaging said pairs of gears in a driving relationship between said countershaft and output shaft, and a single means for drivingly connecting said input and output shafts and operable on upshifting to any of said pairs of gears at least when said engaging means has disengaged said change speed gears for reducing the speed of said input shaft and the various elements drivingly connected thereto so that said engaging means can engage a selected pair of said change speed gears.

3. A change speed gear transmission according to claim 2 wherein said single means drivingly connects said input and output shafts independent of said pairs of gears.

4. A change speed gear transmission according to claim 2 wherein said single means drivingly connects said input and output shafts independent of said countershaft.

5. A change speed gear transmission according to claim 4 wherein said single means comprises a rapid and progressively operating coupling device having a pair of portions one of which is drivingly connected to said input shaft and one of which is drivingly connected to said output shaft and includes controllable means for effecting the coupling and uncoupling of said portions in a driving relationship, said controllable means being operative to effect the coupling of said portions and connect said input and output shafts in a direct drive relationship when said engaging means has disengaged said change speed gears for reducing the speed of the said input shaft and the various elements drivingly connected thereto during upshifting, and for connecting said input shaft and said output shaft when direct drive is desired and being operative to effect the uncoupling of said portions when said engaging means engages any of said change speed gears to drivingly connect said countershaft and output shaft.

6. A change speed transmission comprising in combination, an input means, an output means adapted to be driven by said input means, a plurality of change speed driving means selectively connectable between said input and output means for providing a selected one of a plurality of reduced ratio driving connections therebetween, means for selectively engaging and disengaging said driving means in a driving relationship between said input and output means and including portions drivingly connected to said input means and portions drivingly connected to said output means, and a rapid and progressively operating coupling means operative when completely coupled to connect said input and output means for unitary rotation for coupling said input and output means upon disengagement of said engaging means and reducing the speed of a portion of the engaging means connected to said input means and selective to engage said one driving means to the speed of a portion of said engaging means connected to said output means and selective to engage said one driving means so that said portions of said engaging means are synchronized and can be engaged to connect said one driving means in a driving relatiosnhip between said input and output means.

7. A change speed transmission according to claim 6 wherein said coupling means includes means connecting the same to said input and output means independent to said change speed driving means.

8. A change speed transmission comprising in combination an input means, an output means adapted to be driven by said input means, a plurality of change speed driving means selectively connectable between said input and output means for providing a selected one of a plurality of reduced ratio driving connections therebetween, each of said driving means including a first and a second paired engaging means drivingly connected to said input and output means respectively and adapted to be engaged for drivingly connecting the driving means including the same in a driving relationship between said input and output means and adapted to be disengaged for terminating the driving relationship of the driving means including the same between said input and output means, coupling means operative when completely coupled to connect said input and output means for unitary rotation, control means for said coupling means for effecting the rapid and progressive coupling and the uncoupling of said coupling means between said input and output means and means for actuating said control means to couple said coupling means at least upon upshifting to one of said driving means at least when said engaging means are disengaged whereby said output means acts through said coupling means and said input means and reduces the speed of the first engaging means associated with said one driving means to the speed of the second engaging means associated with said one driving means.

9. A change speed gear transmission comprising in combination an input driven portion including an input shaft, a countershaft, and means drivingly connecting said shafts, an output driven portion including an output shaft, a plurality of selectable pairs of change speed gears for drivingly connecting said countershaft and said output shaft in a selected one of a plurality of reduced speed ratios whereby said input shaft is operative to drive said output shaft in a selected one of a plurality of reduced speed ratios, a first and a second paired engaging means associated with each pair of said pairs of gears and being respectively drivingly connected to and forming a part of said input and output driven portions and including controllable means for engaging the same, each of said pair of engaging means being engageable for connecting the pair of gears associated therewith in a driving relationship between said countershaft and output shaft and disengageable for disconnecting the pair of gears from such driving relationship during both upshifting and downshifting of said transmission, and coupling means including connecting means connecting the same to said input and output driven portions independent of said gears, said coupling means having a coupling condition wherein the same drivingly connects said portions and an uncoupling condition wherein the same disconnects said portions, said coupling means assuming a coupling condition upon upshifting to a selected pair of gears and solely when said engaging means are disengaged for coupling said input driven portion to said output driven portion and reducig the speed of the first engaging means to that of the second engaging means of said pair of engaging means associated with said selected pair of gears whereby said pair of engaging means associated with the selected upshifting pair of gears may be synchronizingly engaged.

10. A change speed gear transmission according to claim 9 wherein said means connecting said coupling means to said driven portions is also independent of said countershaft thereby being operative to connect said portions independent of said gears and countershaft.

11. A change speed gear transmission according to claim 9 wherein said connecting means connects said coupling means to said input and output shafts, said coupling means includes control means for effecting the coupling and uncoupling thereof, said control means effecting the coupling of said coupling means on upshifting for synchronizing the speeds of said engaging means associated with said selected pair of gears and for effecting the uncoupling of said coupling means when said selected pair of gears drivingly connect said input and output shafts and for effecting the coupling of said coupling means when all said engaging means are disengaged thereby connecting said input and output shafts in a direct drive relationship.

12. A change speed gear transmission comprising in combination an input driven portion including an input shaft, a countershaft, and means drivingly connecting said shafts, an output driven portion including an output shaft, a plurality of selectable pairs of change speed gears for drivingly connecting said countershaft and said output shaft in a selected one of a plurality of reduced speed ratios whereby said input shaft is operative to drive said output shaft in a selected one of a plurality of reduced speed ratios, a first and a second paired engaging means associated with each pair of said pairs of gears and being respectively drivingly connected to and forming a part of said input and output driven portions and including controllable means for engaging the same, each of said pair of engaging means being engageable for connecting the pair of gears associated therewith in a driving relationship between said countershaft and output shaft and disengageable for disconnecting the pair of gears from such driving relationship during both upshifting and downshifting of said transmission, and coupling means operative when completely coupled to connect said input and output shafts for unitary rotation, said coupling means having a coupling condition wherein the same drivingly connects said input and output shafts and an uncoupling condition wherein the same disconnects said input and output shafts, said coupling means assuming a coupling condition when upshifting to a selected pair of gears and when said engaging means are disengaged for coupling said input shaft to said output shaft and reducing the speed of the first engaging means to that of the second engaging means of said pair of engaging means associated with said selected pair of gears whereby said pair of engaging means associated with the selected upshifting pair of gears may be synchronizingly engaged.

13. A change speed gear transmission according to claim 12 wherein said countershaft and output shaft are parallel shafts and have overlapping portions, one gear of one pair of said pairs of gears is mounted for unitary rotation on one of said parallel shafts, the other gear of said one pair of gears being mounted for unitary rotation on the other of said parallel shafts, said first and second engaging means associated with said one pair of gears comprises the peripheral teeth of the gears of said one pair of gears, said one gear being axially movable along the shaft carrying the same for moving the peripheral engaging teeth thereof into and out to engagement with the peripheral engaging teeth of the other gear of said pair of gears for engaging and disengaging said engaging means associated with said one pair of gears.

14. A change speed gear transmission according to claim 12 wherein said countershaft and output shaft are parallel shafts and have overlapping portions, one gear of one pair of said pairs of gears is mounted for rotation on one of said parallel shafts, the other gear of said one pair of gears is mounted on the other of said parallel shafts for unitary rotation therewith, a first engaging means being drivingly connected to said one gear and a second engaging means being drivingly connected to said one parallel shaft and cooperatively arranged with said first engaging means, and means for moving said first and second engaging means into engagement for drivingly connecting said one gear to said one parallel shaft.

15. A change speed transmission comprising in combination a first rotatable shaft, a second rotatable shaft spaced from and disposed in a parallel relationship with said first shaft, a plurality of gear means carried by said shafts with each gear means being of a different speed reducing ratio and adapted to be independently and selectively connected in a driving relationship between said shafts for connecting said shafts for counter-rotation in a selected ratio, a separate engaging means associated with each gear means of said plurality of gear means and including first and second portions drivingly connected to said first and second shafts respectively for unitary rotation therewith, said engaging means having a first position wherein the portions thereof are engaged for drivingly connecting the gear means associated therewith in a driving relationship between said shafts and a second position wherein the portions thereof are disengaged for disconnecting the gear means associated therewith from a driving relationship between said shafts, said engaging means including means for engaging and disengaging said portions, a single synchronizing means including first and second coupling portions, first connecting means connecting said first coupling portion to said first shaft and second connecting means connecting said second coupling portion to said second shaft, controllable means operative to couple and uncouple said first and second coupling portions and energizing means for energizing said controllable means at least when the portions of said engaging means are disengaged and upon upshifting between said gear means for coupling said coupling means and synchronizing the speeds of the upshifting engaging means whereby said upshifting coupling means can be synchronizingly engaged.

16. A change speed transmission according to claim 15 wherein said energizing means energizes said controllable means to couple said uncoupling means at least when said portions of said engaging means are disengaged upon upshifting and for energizing said controllable means to uncouple said coupling means when said portions of said engaging means are engaged and includes means responsive to the condition of said transmission with respect to disengagement and engagement of the portions of said engaging means for actuating said energizing means to energize the controllable means to couple and uncouple said coupling means respectively.

17. A change speed transmission according to claim 15 wherein said energizing means includes a pair of signal means, each of said signal means having a first position for signaling said controllable means for coupling said first and second portions and a second position for signaling said controllable means to uncouple said first and second portions, the arrangement being such that both said first and second signal means must be in their first and second positions respectively to signal said controllable means to respectively couple and uncouple said coupling portions, means controllable by the operator for placing said first signal means in its first and second positions, and means automatically responsive to the disengagement and engagement of said engaging portions to place said second signal means in its first and second positions respectively.

18. A change speed transmission comprising in combination, an input shaft, an intermediate shaft including means drivingly connecting the same to said input shaft, an output shaft disposed in parallel relationship with said intermediate shaft and axially overlapping at least a portion thereof, a plurality of pairs of gears with the gears of said pair of gears being constantly in mesh and each pair of gears being of a different ratio than the other of said pairs of gears, one gear of each of said pair of gears being mounted for rotation on one of said parallel shafts, the other gear of each of said pair of gears being mounted on the other of said parallel shafts for unitary rotation therewith, engaging means for selectively and individually engaging said one gear of each of said pairs of gears in a driving relationship with said one shaft and thereby drivingly connecting said parallel shafts and coupling means including means connecting the same to said input and output shafts and operative to connect said input and output shafts for unitary rotation at least when said engaging means is disengaged for coupling said input and output shafts on upshifting and reducing the speed of the input shaft and synchronizing the speeds of said one shaft and the one gear of said pair of gears to which the transmission is being upshifted.

19. A change speed gear transmission according to claim 18 wherein said engaging means has a plurality of cooperating first and second portions, one of said first portions being drivingly connected to each of said one gears and said second portions being drivingly connected to said one shaft and arranged so that one of said second portions is disposed in a cooperative relationship with each of said first portions, the first portion connected to the one of said gears desired to be drivingly connected to said one shaft being engaged with the second portion of said engaging means cooperatively disposed therewith to accomplish the driving connection of said one of said gears and said one shaft.

20. A change speed transmission comprising in combination an input shaft having inner and outer ends, source means of rotative power drivingly connected to the outer end of said input shaft for transmitting torque thereto, a countershaft disposed in parallel spaced relationship relative to said input shaft, gear means carried by said input shaft and countershaft and constantly drivingly connecting the same for counter-rotation with said gear means being drivingly connected to said input shaft intermediate the ends thereof, an output shaft having an inner end and an output end and being disposed coaxially with said input shaft with the inner ends of said shafts disposed in an adjacent relationship, a plurality of selectable pairs of change speed gears for drivingly connecting said countershaft and said output shaft in a selected one of a plurality of reduced speed ratios whereby said input shaft is operative to drive said output shaft in a selected one of a plurality of reduced speed ratios, a first and a second paired engaging means associated with each pair or said pair of gears and being respectively drivingly connected to said countershaft and output shaft and including controllable means for engaging the same, each of said pair of engaging means being engageable for connecting the pair of gears associated therewith in a driving relationship between said countershaft and output shaft and disengageable for disconnecting the pair of gears from such driving relationship during both upshifting and downshifting of said transmission, rapidly and progressively operating coupling means operative when completely coupled to directly connect said input and output shafts for unitary rotation, said coupling means including a pair of cooperating friction means carried by the inner ends of said input and output shafts and power operated means including resilient means carried by one of said input and output shafts for engaging and disengaging said friction means, controllable means for applying power to said power means for engaging said friction means and coupling said input and output shafts, and energizing means for energizing said controllable means upon upshifting and when said engaging means are disengaged for rapidly and progressively frictionally coupling said input shaft to said output shaft and reducing the speed of the first engaging means to that of the second engaging means of said pair of engaging means associated with said selected pair of gears whereby said pair of engaging means associated with the selected upshifting pair of gears may be synchronizingly engaged.

21. A change speed gear transmission according to claim 20 wherein said energizing means energizes said controllable means to apply power to said power means and frictionally engage said friction means at least when said engaging means are disengaged upon upshifting and for energizing said controllable means to operate said power means to disengage said friction means when any of said engaging means are engaged and includes means responsive to the condition of said transmission with respect to disengagement and engagement of said engaging means for actuating said energizing means to energize said controllable means and apply power to said power means to frictionally engage and disengage said friction means respectively.

22. A change speed gear transmission according to claim 20 wherein said countershaft and output shaft are overlapping shafts, one gear of at least one pair of said pairs of gears is mounted for unitary rotation on one of said overlapping shafts, the other gear of said one pair of gears being mounted for unitary rotation on the other of said overlapping shafts, said first and second engaging means associated with said one pair of gears comprises the peripheral teeth of the gears of said one pair of gears, said one gear being axially movable along the shaft carrying the same for moving the peripheral engaging teeth thereon into and out of engagement with the peripheral engaging teeth of the other gear of said pair of gears for engaging and disengaging said engaging means associated with said one pair of gears.

23. A change speed gear transmission according to claim 20 wherein said countershaft and output shaft are overlapping shafts, one gear of at least one pair of said pairs of gears is mounted for rotation on one of said overlapping shafts, the other gear of said one pair of gears is mounted on the other of said overlapping shafts for unitary rotation therewith and is constantly meshed with said one gear, one of said first engaging means is drivingly connected to said one gear and one of said second engaging means which is paired with said one first engaging means is drivingly connected to said one overlapping shaft, and means for moving said first and second engaging means into engagement for drivingly connecting said one gear to said one overlapping shaft.

24. A control mechanism for a device adapted to reduce the speed of the input driven portion of a change speed transmission having a plurality of reduced ratio driving means adapted to be selectively connected between the input and output shafts of the transmission comprising in combination, a source of power for said device including signal responsive means for connecting and disconnecting said source to said device in a power transmitting relationship, a signal source, a pair of signal control means serially connected between said signal source and said signal responsive means, means controllable by the operator for rendering a first of said control means into signal passing and signal blocking positions and means automatically responsive to the condition of said reduced ratio driving means of said transmission with respect to neutral for rendering the other of said signal control means into signal passing condition when said reduced ratio driving means are in neutral and for rendering it into a signal blocking condition when any one of said plurality of reduced ratio driving means of said transmission is selectively connected between said input and output shafts.

25. In a transmission having an input driven portion in-including an input shaft, an output driven porton including an output shaft, a plurality of reduced ratio driving means adapted to be selectively drivingly connected between the input and output shafts of the transmission and manually operable means for selectively connecting the desired driving means of said plurality of said driving means, a control system for a device adapted to reduce the speed of said input driven portion comprising in combination, a source of power for said device including signal responsive means for connecting and disconnecting said source to said device in a power transmitting relationship, a signal source, a pair of signal control means serially connected between said signal source and said signal responsive means, controllable means associated with said manually operable means and controllable simultaneously therewith by the operator for rendering a first of said control means into signal passing and signal blocking position and means automatically responsive to the condition of said reduced ratio driving means of said transmission with respect to neutral for rendering the other of said signal control means into signal passing condition when said reduced ratio driving means are in neutral and for rendering it into a signal blocking condition when any one of said plurality of reduced ratio driving means is selectively connected between the input and output shafts.

26. In a change speed transmission having an input driven portion including an input shaft, an output driven portion including an output shaft, a plurality of reduced ratio driving means adapted to be selectively connected between the input and output shafts of the transmission, and a rapidly and progressively operating coupling device for coupling the input and output shafts on upshifting and thereby reducing the speed of the input driven portion of the transmission, a control system for said device comprising in combination, a controllable source of power for said device including control means for connecting and disconnecting said source to said device in a power transmitting relationship, said control means being at least automatically responsive to the condition of said reduced ratio driving means of said transmission with respect to the connection and disconnection thereof between said input and output shafts for rendering said control means in a condition for supplying power to said device from said source when said reduced ratio driving means are all disconnected and for rendering said control means in a condition wherein it blocks said source of power from said device when any one of said plurality of reduced ratio driving means of said transmission is selectively connected between said input and output shafts.

27. In a change speed transmission the combination of an input shaft, an output shaft, means for providing a direct drive between said shafts and including a rapidly and progressively operating mechanism for completing the direct drive when activated, a plurality of reduced ratio drive means selectively connectable between said input and output shafts and means activating said mechanism for reducing the speed of said input shaft during upshifting of said drive means and for providing a direct drive between said input and output shafts when said drive means are disconnected from between said input and output shafts.

28. In a change speed transmission the combination of an input shaft, an output shaft, means for providing a direct drive between said shafts and including a rapidly and progressively operating mechanism for completing the direct drive when activated, a plurality of reduced ratio drive means selectively connectable between said input and output shafts and means activating said mechanism when said drive means are disconnected for providing direct drive between said input and output shafts and for reducing the speed of said input shaft during up-shifting of said drive means and deactivating said mechanism when any one of said drive means is connected between said input and output shafts for terminating the direct drive.

References Cited

UNITED STATES PATENTS

| | | | |
|---|---|---|---|
| 2,727,602 | 12/1955 | Saives | 192—4 |
| 2,745,526 | 5/1956 | Saives | 192—4 |
| 2,875,872 | 3/1959 | Backus | 192—3.5 |
| 2,943,515 | 7/1960 | Isaacson et al. | 192—4 |
| 2,961,078 | 11/1960 | Shannon et al. | 192—4 |
| 3,149,498 | 9/1964 | Mack | 192—4 |

FOREIGN PATENTS 188,087  11/1922  Great Britain.

FRED C. MATTERN, Jr., *Primary Examiner.*

DAVID J. WILLIAMOWSKY, *Examiner.*

C. J. HUSAR, *Assistant Examiner.*